(12) United States Patent
Garcia

(10) Patent No.: US 8,091,513 B1
(45) Date of Patent: Jan. 10, 2012

(54) PET SECURING DEVICE FOR CARS

(76) Inventor: Daniel Garcia, San Antonio, TX (US)

( * ) Notice: Subject to any disclaimer, the term of this patent is extended or adjusted under 35 U.S.C. 154(b) by 12 days.

(21) Appl. No.: 12/832,435

(22) Filed: Jul. 8, 2010

(51) Int. Cl.
*A01K 29/00* (2006.01)

(52) U.S. Cl. .......................... 119/771; 119/28.5; 119/753

(58) Field of Classification Search .................. 119/753, 119/756, 755, 754, 771, 496, 498, 499, 482, 119/514, 452, 453, 497, 472, 747, 489, 491, 119/492, 512, 513, 28.5; D30/118; 296/24.31, 296/24.34; 297/254, 250.1, 255, 256.1, 256, 297/256.12, 256.13, 256.15, 256.16, 256.17, 297/256.11
See application file for complete search history.

(56) References Cited

U.S. PATENT DOCUMENTS

| | | | | |
|---|---|---|---|---|
| 4,010,880 | A * | 3/1977 | Guillot-Munoz | 224/275 |
| 4,512,286 | A * | 4/1985 | Rux | 119/771 |
| 4,597,359 | A * | 7/1986 | Moorman | 119/28.5 |
| 4,943,105 | A | 7/1990 | Kacar et al. | |
| 5,123,377 | A * | 6/1992 | Edwards | 119/28.5 |
| 5,133,294 | A | 7/1992 | Reid | |
| 5,479,892 | A * | 1/1996 | Edwards | 119/771 |
| 5,487,361 | A | 1/1996 | Dean | |
| 5,785,003 | A | 7/1998 | Jacobson et al. | |
| D465,620 | S | 11/2002 | Stepp | |
| 6,564,750 | B1 | 5/2003 | Collins | |
| 6,588,365 | B2 * | 7/2003 | Best Wright | 119/28.5 |
| 6,591,787 | B1 * | 7/2003 | Gantz et al. | 119/771 |
| 7,383,789 | B2 * | 6/2008 | Wilkes | 119/771 |
| 7,448,345 | B1 * | 11/2008 | O'Donnell | 119/28.5 |
| 2006/0150922 | A1 | 7/2006 | Kroculick | |
| 2008/0011234 | A1 | 1/2008 | Wilkes | |
| 2008/0156275 | A1 | 7/2008 | Lam | |
| 2008/0184937 | A1 | 8/2008 | Hoffman et al. | |

* cited by examiner

*Primary Examiner* — T. Nguyen

(57) ABSTRACT

A securing device for helping to keep a pet secure and safe in the back of a car featuring a vertical and horizontal platform connectable via a hook and slot mechanism; headrest straps disposed on the top edge of the vertical platform for harnessing headrests of front seats of the car; adjustable legs disposed on the bottom edge of the vertical platform for engaging the floorboard of the backseat of the vehicle; winged sideboards pivotally attached side edges of the vertical platform; hook components disposed on the vertical platform for engaging bottom areas of the front seats of the vehicle; and an extension panel pivotally attached to a front edge of the horizontal platform for providing additional length to the horizontal platform.

5 Claims, 5 Drawing Sheets

PET SECURING DEVICE FOR CARS

FIELD OF THE INVENTION

The present invention is directed to a car accessory for pets, more particularly to a pet securing device featuring a platform that is attachable to the rear of the driver's or front passenger's seat.

BACKGROUND OF THE INVENTION

Dogs placed in the back seat of a car may get hurt if not secured properly. Or in some cases, the dogs may damage the seat and interior of the vehicle if they are too overactive. The present invention features a securing device for helping to keep a pet (e.g., a dog) secure and safe in the back of a car. The securing device can also help protect the vehicle's seats and interior from damage caused by an overactive pet. The device is easy to install and remove, and the device is also easy to clean.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a securing device for helping to keep a pet (e.g., a dog) secure and safe in the back of a car. In some embodiments, the securing device comprises a vertical platform; a first headrest strap disposed on a top edge of the vertical platform near a first side edge of the vertical platform and a second headrest strap disposed on a top edge of the vertical platform near a second side edge of the vertical platform, the headrest straps function to harness headrests of front seats of a vehicle; one or more adjustable legs disposed on a bottom edge of the vertical platform, the adjustable legs function to rest on a floorboard of the backseat of the vehicle to provide support for the vertical platform; at least one slot disposed in the vertical platform; a first winged sideboard pivotally attached to the first side edge of the vertical platform and a second winged sideboard pivotally attached to the second side edge of the vertical platform, the winged panels can each pivot between an out position pivoted away from the vertical platform and an in position pivoted toward the vertical platform; and one or more hook components disposed on the vertical platform at or near a bottom edge, the hook components function to engage bottom area of the front seats of the vehicle for securing of the vertical platform to the front seats. In some embodiments, the securing device further comprises a horizontal platform; a non-skid surface disposed on a top surface of the horizontal platform; a hook disposed on a back edge of the horizontal platform, the hook is adapted to engage the slot in the vertical platform to position the horizontal platform generally horizontally with respect to the vertical platform; and an extension panel pivotally attached to a front edge of the horizontal platform, the extension panel can pivot between multiple positions including a storage position pivoted atop the horizontal platform and an extended position pivoted away from the horizontal platform, the extension panel functions to provide additional length to the horizontal platform.

In some embodiments, the securing device further comprises a handle disposed in the vertical platform at or near the top edge of the vertical platform. The securing device of claim 1, wherein the headrest straps are adjustable to achieve an appropriate fit around the headrests of the front seats of the vehicle. In some embodiments, the securing device further comprises one or more holes disposed in the vertical platform to allow for communication between front and rear areas of the vehicle. In some embodiments, the securing device further comprises a first elastic strap attached to a back surface of the first winged sideboard and a back surface of the vertical platform, and a second elastic strap attached to a back surface of the second winged sideboard and the back surface of the vertical platform.

DESCRIPTION OF PREFERRED EMBODIMENTS

Figure 1:
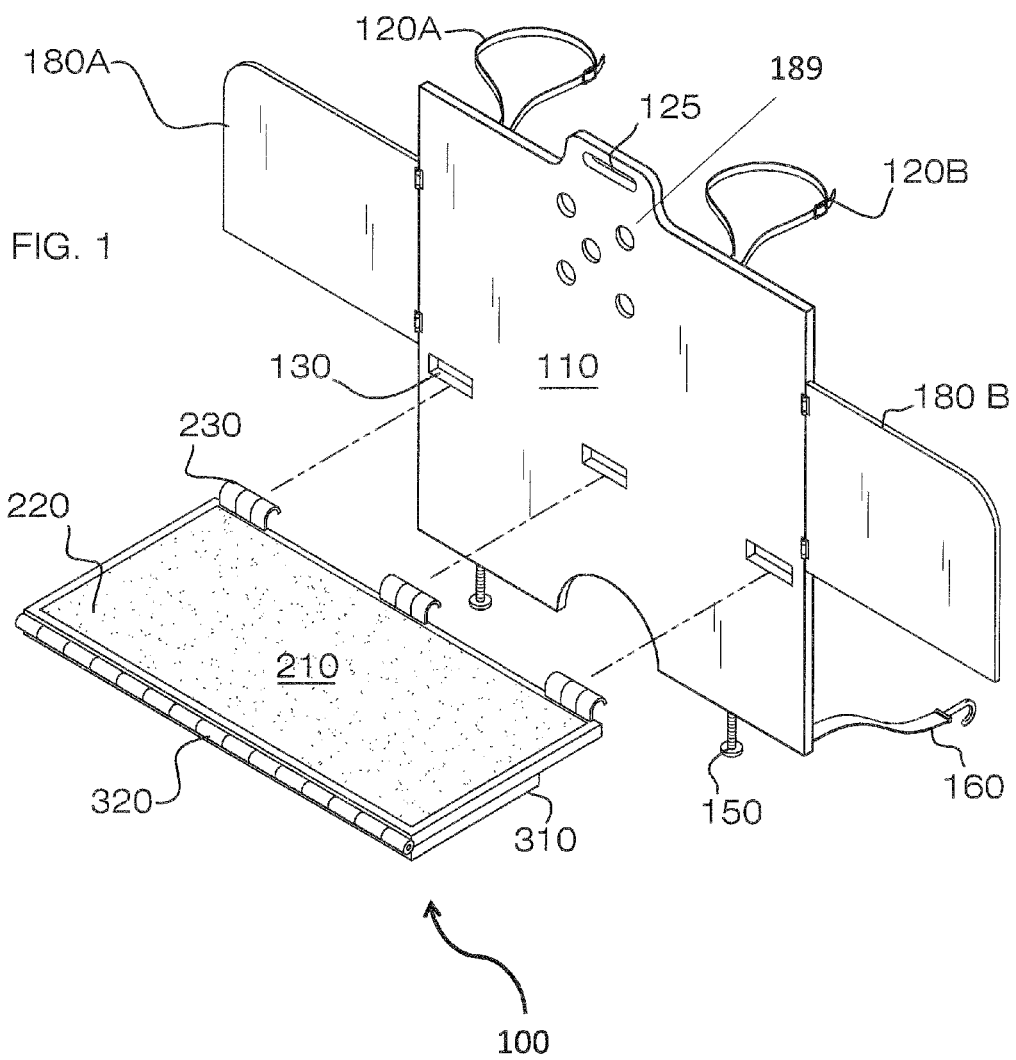
FIG. 1 is a perspective view of the securing device of the present invention.
Figure 2:
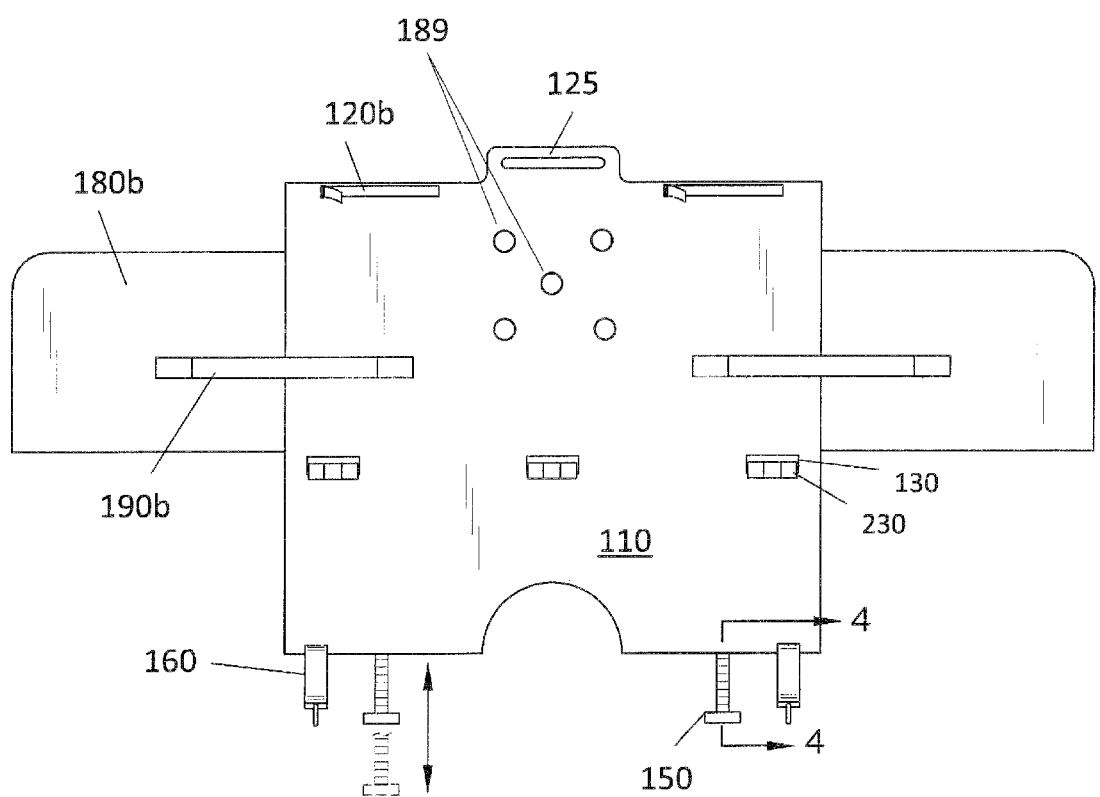
FIG. 2 is a back view of the securing device of FIG. 1.
Figure 3:
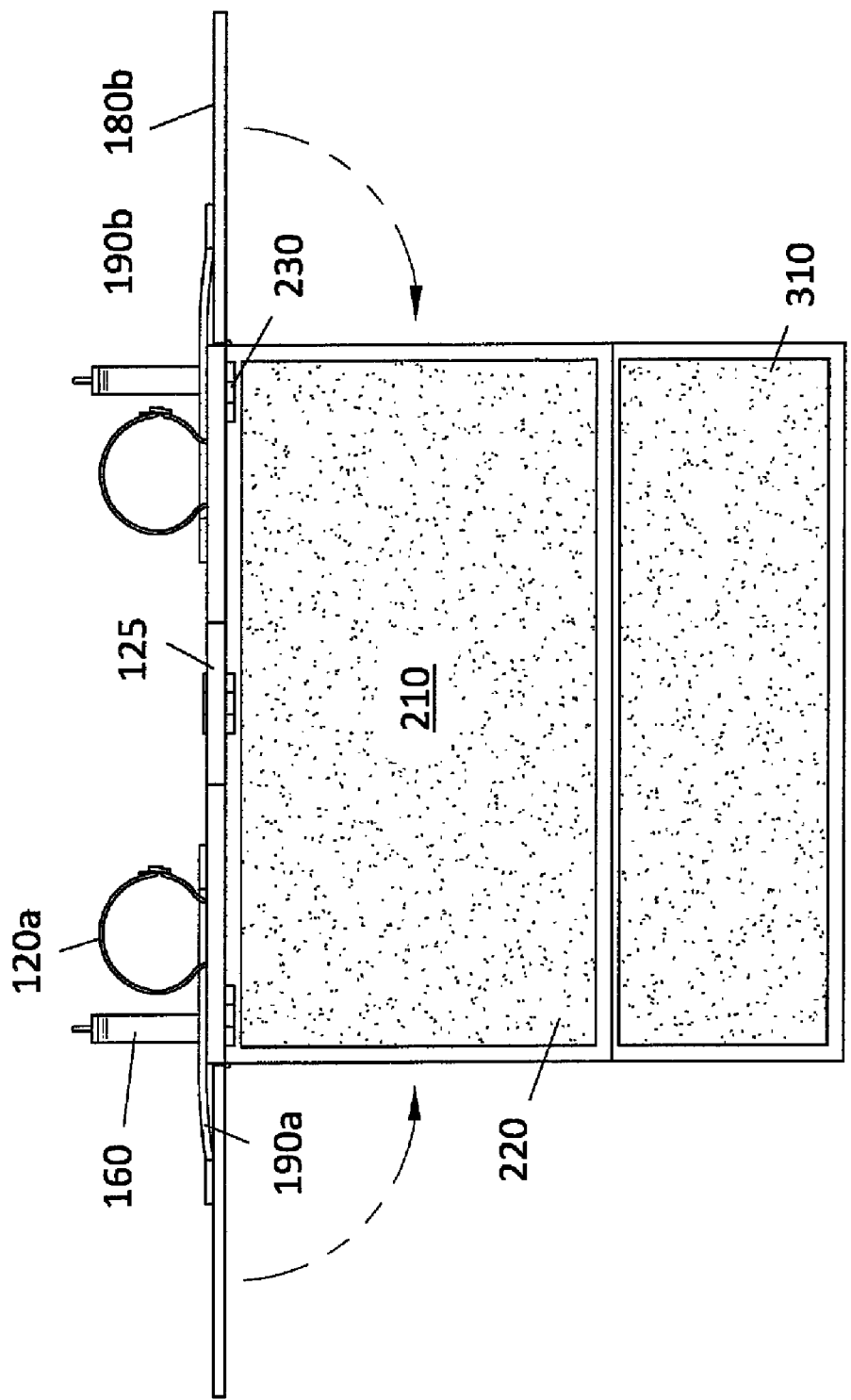
FIG. 3 is a top view of the securing device of FIG. 1.

Referring now to FIGS. 1-5, the present invention features a securing device for helping to keep a pet (e.g., a dog) secure and safe in the back of a car. The device can also help protect the vehicle's seats and interior from damage caused by an overactive pet.

The device 100 of the present invention comprises a vertical platform 110 and a horizontal platform 210. The vertical platform 110 has a front surface, a back surface, a first side edge, a second side edge, a top edge, and a bottom edge. Disposed on the top edge of the vertical platform 110 are a first headrest strap 120a and a second headrest strap 120b. The first headrest strap 120a may be positioned near the first side edge of the vertical platform 110 and the second headrest strap 120b may be positioned near the second side edge of the vertical platform 110. The headrest straps 120 function to harness the headrests 102 of the front seats of the vehicle. The headrest straps 120 may be adjustable to as to achieve an appropriate fit around the headrests. In some embodiments, a handle 125 is disposed in the vertical platform 110, for example at the top edge of the vertical platform.

Figure 4:
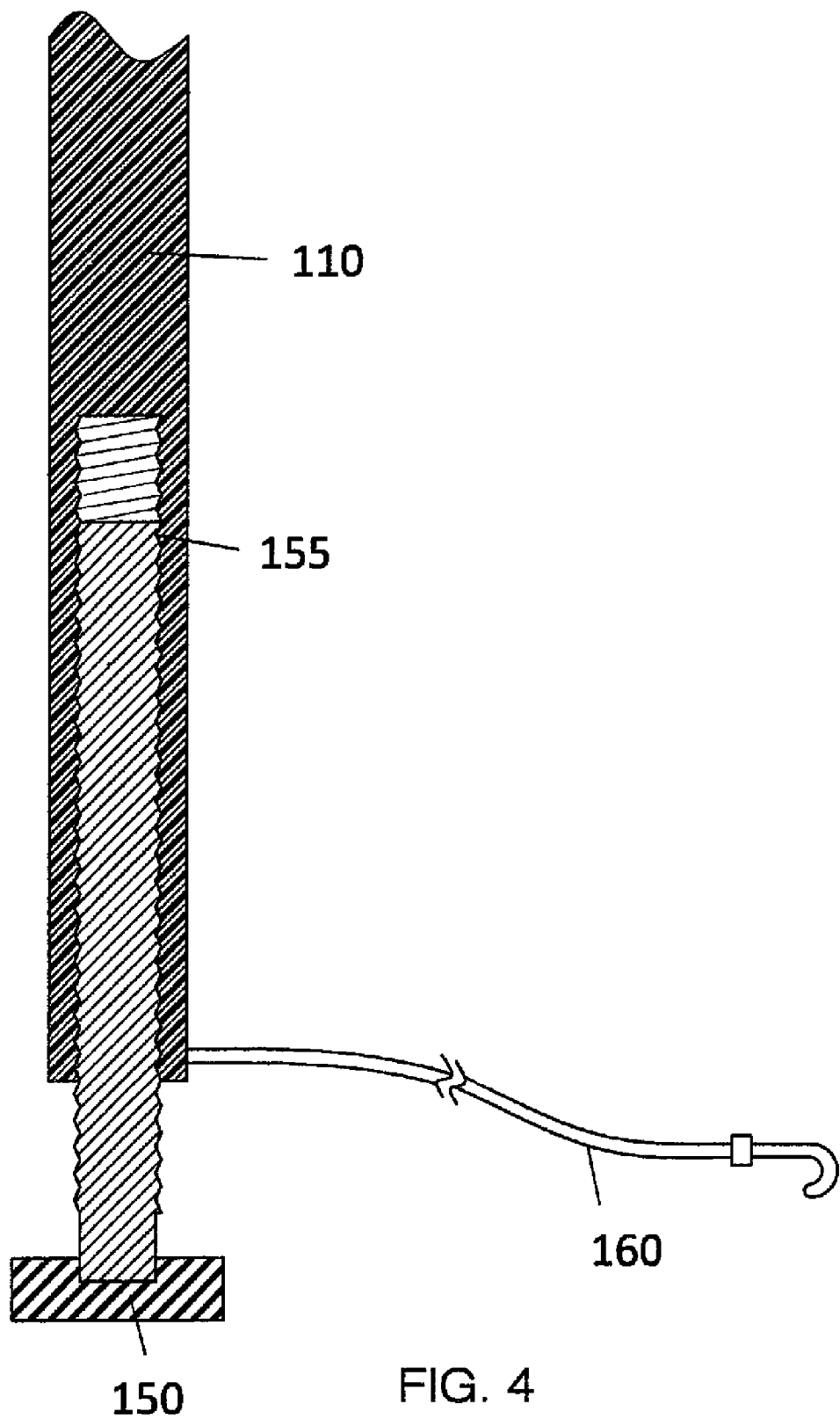
FIG. 4 is a side cross sectional view of the securing device of FIG. 1.
Figure 5:
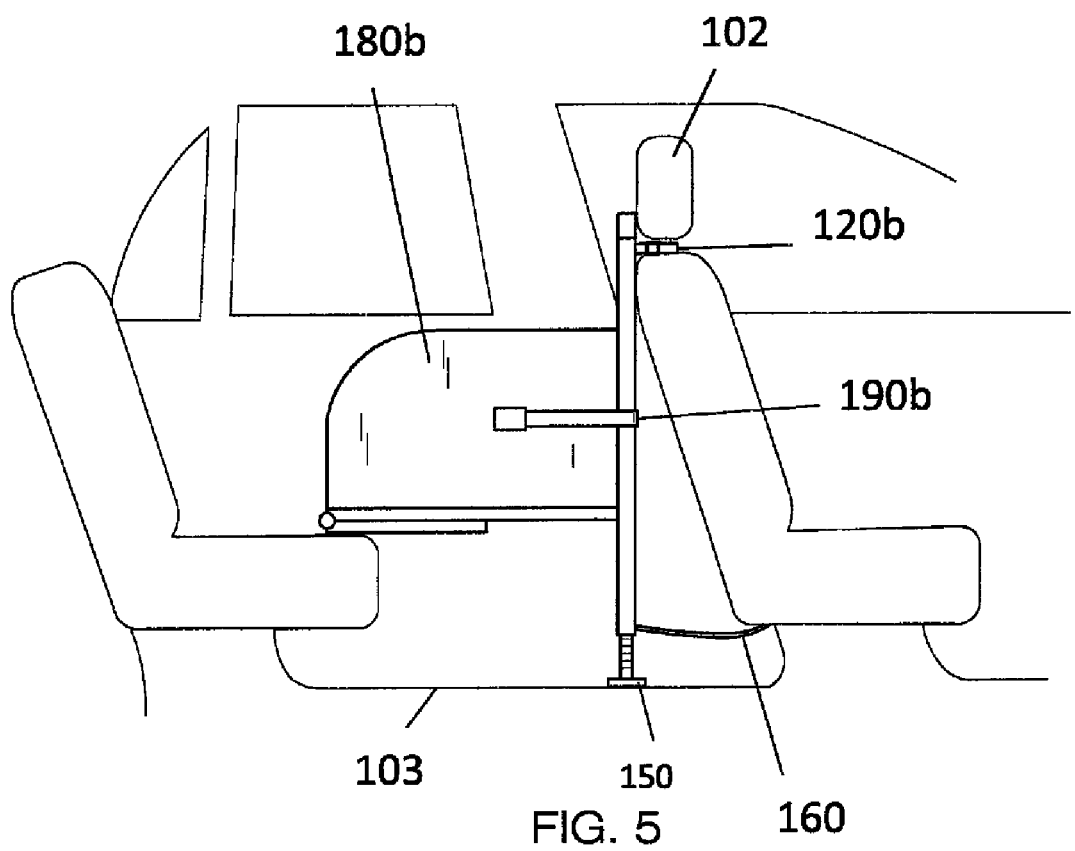
FIG. 5 is an in-use view of the securing device of FIG. 1.

In some embodiments, one or more adjustable legs 150 are disposed in the bottom edge of the vertical platform 110. The adjustable legs 150 function to rest on the floorboard 103 of the backseat of the vehicle, providing support for the vertical platform 110. The adjustable legs 150 may be adjustable in length to accommodate various sizes of vehicles (e.g., various sizes between floorboards and headrests, etc.). For example, in some embodiments, the adjustable legs 150 are threaded into the bottom edge of the vertical platform 110 or in some embodiments, the adjustable legs are telescopic poles. FIG. 4 shows an example of adjustable legs having threads 155 which engage threads in the bottom edge of the vertical platform 110.

The horizontal platform 210 is designed to attach to the vertical platform 110 such that the horizontal platform 210 is positioned horizontally and the vertical platform 110 is positioned vertically, wherein the angle between the platforms 110, 210 is about 90 degrees (however, the present invention is not limited to this angle). The horizontal platform 210 has a top surface, a bottom surface, a first side edge, a second side edge, a back edge, and a front edge. Disposed on the top surface of the horizontal platform 210 is a non-skid surface 220 for providing stability to a pet placed atop the horizontal platform 210. One or more hooks 230 are disposed on the back edge of the horizontal platform 210.

At least one slot 130 is disposed in the vertical platform 110, for example in a middle portion of the vertical platform 110. The slots 130 are adapted to temporarily receive the hooks 230 disposed on the back edge of the horizontal platform 210.

An extension panel 310 is pivotally attached to the front edge of the horizontal platform 210 via a hinge 320. The extension panel 310 may pivot between several positions, for example from a storage position (see FIG. 1) and an extended position (see FIG. 3). The extension panel 310, when in the extended position, may provide additional space for the pet.

In some embodiments, a first winged sideboard 180a is pivotally attached to the first side edge of the vertical platform 110 (e.g., via a hinge mechanism), and a second winged sideboard 180b is pivotally attached to the second side edge of the vertical platform 110 (e.g., via a hinge mechanism). The winged sideboards 180 can provide protection for other areas (e.g., side panels) of the vehicle, as well as help to enclose the pet placed on the horizontal platform 210. In some embodiments, a first elastic strap 190a is attached to the back surface of the first winged sideboard 180a and the back surface of the vertical platform 110. In some embodiments, a second elastic strap 190b is attached to the back surface of the second winged sideboard 180b and the back surface of the vertical platform 110 (see FIG. 3).

In some embodiments, one or more hook components 160 (e.g., an elastic strap with a hook) are disposed on the vertical platform 110, for example at or near the bottom edge. The hook components 160 may be used to hook to the bottom area of the front seat of the vehicle for additional securing of the device 100 (see FIG. 5).

The device 100 of the present invention is foldable between several positions for storage and for use. For example, the extension panel 310 can pivot between a storage position and an extended position. The winged panels 180 can also pivot between an out position (see FIG. 3) and an in position (see FIG. 5). The device 100 of the present invention may be constructed in variety of sizes. For example, in some embodiments, the vertical platform 110 is between about 30 to 40 inches in width as measured from the first side edge to the second side edge. In some embodiments, the vertical platform 110 is between about 40 to 50 inches (e.g., 46 inches) in width as measured from the first side edge to the second side edge.

To use the device 100 of the present invention, a user can attach the headrest straps 120 over the headrests 102 of the front seats of the vehicle. The user can then extend the adjustable legs 150 to the height appropriate for contacting the floorboard 103 of the vehicle. The device 100 may be further anchored by hooking the hook components 160 under the bottom of the front seats. Next, the user may attach the horizontal platform 210 to the vertical platform 110 via the slots 130 and hooks 230. If needed, the user can move the extension panel 310 to the extended position.

In some embodiments, one or more holes 189 (e.g., 3 inch in diameter, diameter is not limited to 3 inches) are disposed in the vertical platform 110 to allow for communication between the front and rear areas of the vehicle. In some embodiments, the device 100 is lined with washable outdoor carpet or fabric. In some embodiments, the winged sideboards 180 fold outwardly with the elastic straps 190 on the back, keeping tension against the vehicle's door panel.

As used herein, the term "about" refers to plus or minus 10% of the referenced number. For example, an embodiment wherein the vertical platform 110 is about 50 inches in length includes a vertical platform between 45 and 55 inches in length.

The disclosures of the following U.S. Patents are incorporated in their entirety by reference herein: U.S. Pat. No. 5,785,003; U.S. Pat. Application No. 2008/0011234; U.S. Pat. No. 4,943,105; U.S. Pat. No. 6,564,750; U.S. Pat. Application No. 2006/0150922; U.S. Pat. No. 5,133,294; U.S. Pat. Application No. 2008/0184937; U.S. Pat. No. 5,487,361; U.S. Pat. Application No. 2008/0156275.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A securing device comprising:
   (a) a vertical platform;
   (b) a first headrest strap disposed on a top edge of the vertical platform near a first side edge of the vertical platform and a second headrest strap disposed on a top edge of the vertical platform near a second side edge of the vertical platform, the headrest straps function to harness headrests of front seats of a vehicle;
   (c) one or more adjustable legs disposed on a bottom edge of the vertical platform, the adjustable legs function to rest on a floorboard of the backseat of the vehicle to provide support for the vertical platform;
   (d) at least one slot disposed in the vertical platform;
   (e) a first winged sideboard pivotally attached to the first side edge of the vertical platform and a second winged sideboard pivotally attached to the second side edge of the vertical platform, the winged panels can each pivot between an out position pivoted away from the vertical platform and an in position pivoted toward the vertical platform;
   (f) one or more hook components disposed on the vertical platform at or near a bottom edge, the hook components function to engage bottom area of the front seats of the vehicle for securing of the vertical platform to the front seats;
   (g) a horizontal platform;
   (h) a non-skid surface disposed on a top surface of the horizontal platform;
   (i) a hook disposed on a back edge of the horizontal platform, the hook is adapted to engage the slot in the vertical platform to position the horizontal platform generally horizontally with respect to the vertical platform; and
   (j) an extension panel pivotally attached to a front edge of the horizontal platform, the extension panel can pivot between multiple positions including a storage position pivoted atop the horizontal platform and an extended position pivoted away from the horizontal platform, the extension panel functions to provide additional length to the horizontal platform.

2. The securing device of claim 1 further comprising a handle disposed in the vertical platform at or near the top edge of the vertical platform.

3. The securing device of claim 1, wherein the headrest straps are adjustable to achieve an appropriate fit around the headrests of the front seats of the vehicle.

4. The securing device of claim 1 further comprising one or more holes disposed in the vertical platform to allow for communication between front and rear areas of the vehicle.

5. The securing device of claim 1 further comprising a first elastic strap attached to a back surface of the first winged sideboard and a back surface of the vertical platform, and a second elastic strap attached to a back surface of the second winged sideboard and the back surface of the vertical platform.

* * * * *